(12) United States Patent
Jore

(10) Patent No.: US 6,176,654 B1  
(45) Date of Patent: *Jan. 23, 2001

(54) REVERSIBLE DRILL/DRIVER TOOL

(76) Inventor: Matthew B. Jore, P.O. Box 735, Ronan, MT (US) 59864

( * ) Notice: Under 35 U.S.C. 154(b), the term of this patent shall be extended for 0 days.

This patent is subject to a terminal disclaimer.

(21) Appl. No.: 09/111,568

(22) Filed: Jul. 8, 1998

Related U.S. Application Data

(63) Continuation of application No. 08/439,355, filed on May 11, 1995, now Pat. No. 5,779,404, which is a continuation-in-part of application No. 08/236,992, filed on May 2, 1994, now Pat. No. 5,470,180.

(51) Int. Cl.[7] .................................................. B23B 31/10
(52) U.S. Cl. ........................ 408/239 R; 279/14; 279/75; 279/82; 408/240
(58) Field of Search .................... 408/81, 97, 112, 408/186, 201, 224, 225, 713, 189, 191, 196, 238, 239 A, 239 R, 240; 7/165; 279/14, 74, 75, 82, 83

(56) References Cited

U.S. PATENT DOCUMENTS

| | | | |
|---|---|---|---|
| 4,573,839 | * 3/1986 | Finnegan | 408/239 R |
| 4,692,073 | 9/1987 | Martindell . | |
| 4,900,202 | * 2/1990 | Wienhold | 279/75 |
| 5,398,946 | * 3/1995 | Quiring | 279/75 |
| 5,470,180 | * 11/1995 | Jore | 408/239 R |
| 5,779,404 | * 7/1998 | Jore | 408/239 R |

* cited by examiner

Primary Examiner—Daniel W. Howell  
(74) Attorney, Agent, or Firm—Richard C. Conover

(57) ABSTRACT

An improved two-ended reversible drill/driver tool for use with power drills. The tool having a hollow cylindrical socket that at one end has a drive shank for insertion into a chuck of a powered drill, and, at the opposite end, has a polygonally shaped opening therein for receiving a correspondingly shaped, two-ended, reversible tool assembly. This tool assembly is sized to slide within the hollow socket, and has a combined drill bit and countersink at one end, and, at the other end, a polygonally shaped opening for accepting a screw driver bit having a shank with a polygonal cross section.

8 Claims, 3 Drawing Sheets

REVERSIBLE DRILL/DRIVER TOOL

This application is a continuation of application Ser. No. 08/439,355 filed May 11, 1995 now U.S. Pat. No. 5,779,404, which was a continuation-in-part of application Ser. No. 08/236,992 filed May 2, 1994, now U.S. Pat. No. 5,470,180.

BACKGROUND OF THE INVENTION

This invention relates to an improved tool for use with a powered drill. The tool includes a two-ended reversible tool assembly with one end having a bit for drilling a pilot hole and countersink, and the other end having a screwdriver for driving a screw into the pilot hole.

Presently, carpenters and other builders often use a combination of tools to accomplish the task of drilling and countersinking pilot holes for screws and then driving a screw into the pilot hole. Generally, they either have used two powered drills with one holding a pilot-hole, drill-bit attachment and the other holding a screwdriving attachment, or they have used one drill in which the separate attachments were alternately clamped into the chuck of the single drill with a corresponding waste of time.

There have been several previous attempts to solve the problem of maintaining two attachments available for use in one tool clamped in a powered drill. U.S. Pat. No. 3,023,015 to Pankow illustrates an elongate tubular cylindrical dual socket having a drill chuck engaging tang at one end. The other end of the socket is designed to releasably hold reversible screwdriver and countersink attachments. This socket accommodates only specially manufactured bits, both for the screwdriver and the countersink attachments, each having a lateral stop flange to limit insertion depth into the socket. The bits are held in place with set screws. A ball detent device positioned on the socket is used to transmit rotational energy from the drill to a bit. Transmitting rotational energy in this fashion through the sloping walls of a bail in a detent puts considerable deforming strain on the socket. A guide sleeve is also provided to cover the ball detent device. A pair of exposed springs attached to the sleeve resiliently holds the sleeve on the socket.

U.S. Pat. No. 4,676,703 to Swanson also illustrates a reversible drill bit and drive tool holder. The reversible drill and driver tool holder pivotally holds the dual ended socket for holding the reversible tools. The bits are held in place in the socket with set screws. The tool holder is machined to receive the particular tool not being used in a Position within the holder so as to be out of the way. A user pivots the socket within the tool holder to position the apropriate tool against the work piece.

From the above, it can be seen that a need exists for a simple two-ended reversible tool assembly for use with a powered drill. The reversible tool socket should be capable of accepting a wide variety of screw driving bits and should also be capable of transmitting rotational energy from the drill to the bit without being subject to wear.

Further, there are widely-available commercial screw driver bits having hexagonal shanks. These bits are used by carpenters and builders with drill sockets having a corresponding hexagonal shape. These bits are commonly used today as replacement bits thereby eliminating the necessity of replacing the entire screwdriver. A need exists for a reperssible bit drill attachment capable of accepting these conventional hexaconal shanked bits.

SUMMARY OF INVENTION

The present invention relates to an improved two-ended reversible drill/driver tool for power drills. The reversible drill/driver tool has a hollow cylindrical socket that at one end has a drive shank for insertion into a chuck of a powered drill, and at the opposite end has a polygonally shaped opening therein.

A separate, two-ended, reversible tool assembly, sized to slide within the hollow socket, has a combined drill bit and countersink at one end, and at the other end a polygonally shaped opening for accepting a screwdriver bit having a shank with a polygonal cross-section. The countersink is a conventional countersink and may have a relief section for chip removal. A magnet attached to the reversible tool assembly is placed adjacent the polygonally shaped opening at the opposite end from the countersink to magnetically hold the screwdriver bit in the reversible tool assembly. With this arrangement, the screwdriver bit can easily be pulled away from the magnet to be replaced with another bit.

To prevent rotation of the tool assembly within the socket, a portion of the tool located intermediate the ends of the reversible tool assembly has a polygonally shaped exterior surface. This polygonally shaped surface mates with a similarly shaped interior surface of the hollow socket. These surfaces permit rotary motion to be transmitted by the drill, through the drive shank, through the socket, to an exposed attachment. Further, this drive arrangement between the socket and the tool holder minimizes the deforming, rotational strain on the socket when the drill is operated.

To prevent the reversible tool from inadvertently slipping out of the socket, the reversible tool assembly is releasably locked to the hollow socket using a ball removeably positioned in a locking groove. A hollow cylindrical sleeve, slideably surrounding the outer surface of the socket, is used to removeably position the ball in the locking groove. When the sleeve is moved toward the drive shank the ball is positioned in the locking groove. When the sleeve is moved toward the exposed bit end of the socket the ball may be removed from the locking groove by pulling the reversible tool out of the socket. The sleeve freely rotates on the socket and can be held with one hand while operating the powered drill with the other.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF PREFERRED EMBODIMENTS

Figure 1:
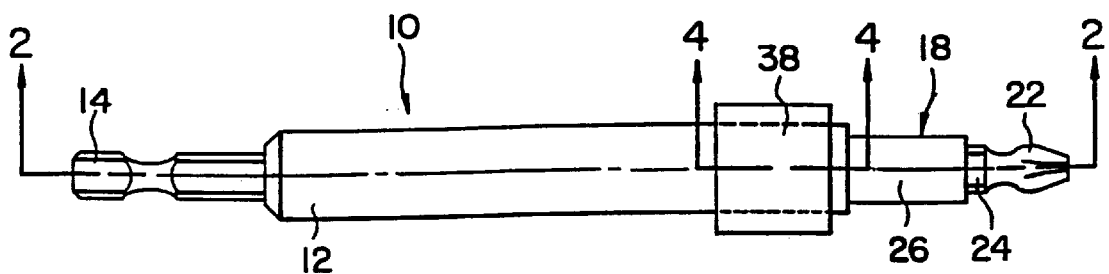
FIG. 1 is an elevational view of an elongate reversible drill/driver tool of the present invention.
Figure 2:
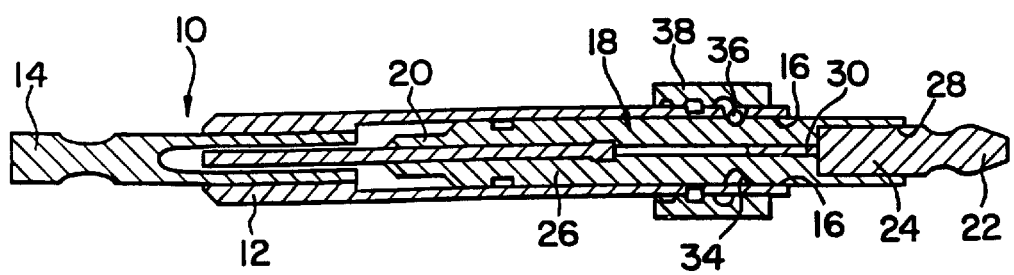
FIG. 2 is a cross-sectional view along a line 2—2 in FIG. 1.
Figure 3:
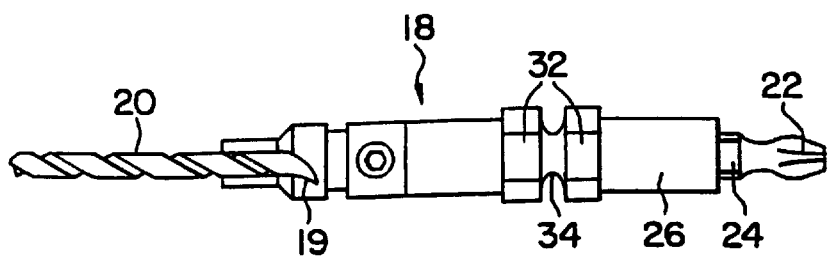
FIG. 3 is an elevational of a two-ended reversible tool assembly.

A preferred embodiment of the reversible drill/driver tool 10 is shown in FIG. 1. The elongate reversible drill/driver tool 10 has a hollow socket 12 which has a drive shank 14 at one end to be received by a chuck of a powered drill. At the other end, hollow socket 12 has a polygonally shaped first opening 16 for slideably receiving two-ended, reversible tool assembly 18.

The reversible tool assembly 18 has a conventional countersink and drill bit 20 at one end that is used for boring pilot holes in a workpiece, although other tools including other screwdriver bits could be inserted equally as well. At the other end reversible tool assembly 18 has a conventional screw driver bit 22 with a shank that has a polygonal cross-section 24. In the drawings, the screw driver bit 22 is illustrated as a Phillips head screw driver, but any other screw driver bit, such as a straight blade, Allen wrench, or other socket driver having a polygonal cross-section, could be used equally as well.

Figure 5:
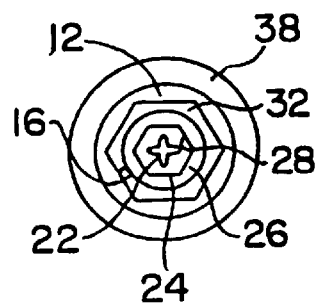
FIG. 5 is an end view of the right end of the elongate reversible drill/driver tool shown in FIG. 1.

A generally circular cross-section central body 26 holds countersink and drill bit 20 on one end and screw driver bit 22 at the other end. Body 26 has a polygonally shaped second opening 28 at one end, which in the preferred embodiment is a hexagonal shape as best seen in FIG. 5. Opening 28 is sized to accept a screw driver bit 22 that also has a similar polygonally shaped cross-sectional shank 24. A magnet 30 is attached to body 26 adjacent second polygonally shaped opening 28 to hold a screw driver bit 22 inserted into the opening. Although body 26 has a generally circular cross-section shape, a polygonally shaped portion 32 is formed on body 26 intermediate the ends thereof and sized to slide through a mating polygonally shaped first opening 16. Polygonally shaped portion 32 of body 26 mates with polygonally shaped first opening 16 of socket 12 to prevent tool assembly 18 from rotating inside hollow socket 12. The mating of body 26 with socket 12 assures a positive, non-rotational match between two mating parts and avoids placing deforming strain on the tool retaining socket 12 when the drill is operated to rotate the tool. Rotary motion transmitted from drive shank 14 to screw driver bit 22 is transmitted through the polygonally shaped mating surfaces.

Figure 4A:
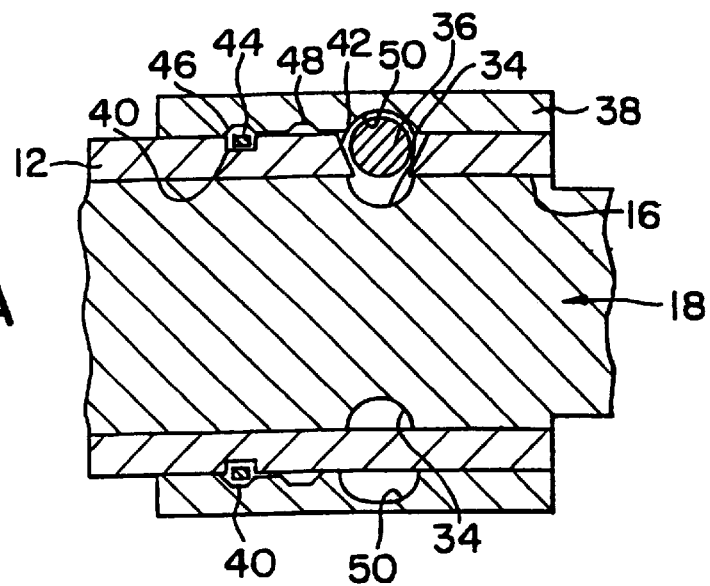
FIG. 4a is an enlarged cross-sectional view along a line 4—4 in FIG. 1 illustrating a locking mechanism for the two-ended reversible tool assembly with a sleeve positioned in an unlocked position.
Figure 4B:
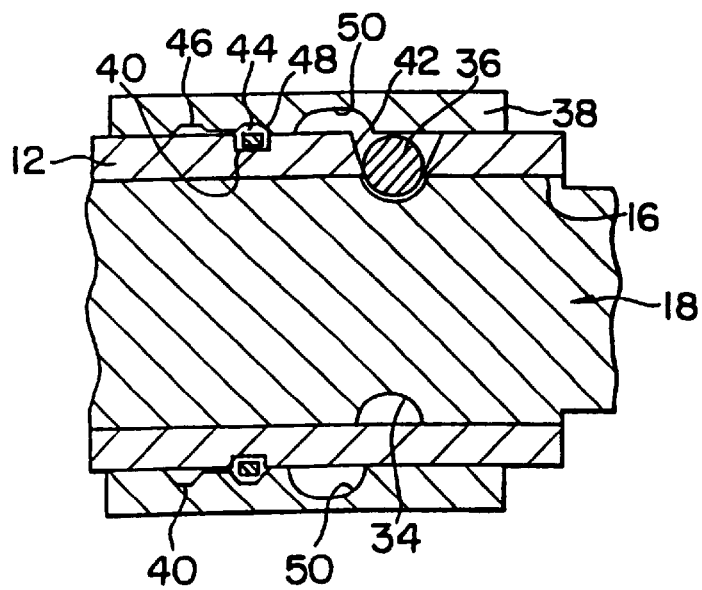
FIG. 4b is the same cross-section view as FIG. 4a with the sleeve moved to a locked position.

As best seen in FIGS. 4a and 4b, socket 12 is provided with a tapered hole 42 to receive a detent ball 36. The interior opening of hole 42 is sized to have a diameter smaller than the diameter of detent ball 36 to prevent detent ball 36 from dropping out of hole 42, but sufficient large to allow a portion of detent ball 36 to extend outwardly beyond hole 42.

A groove 34 is cut in polygonal shaped portion 32 of reversible tool assembly 18. This groove is sized to removeably receive the portion of detent ball 36 extending outwardly beyond hole 42. With the detent ball 36 held in groove 34, as explained below, the reversible tool assembly 18 is prevented from inadvertently slipping out of socket 12.

A cylindrical sleeve 38 is fitted around socket 12. This sleeve is provided with an interior angular groove 50. As best seen in FIGS. 4a and 4b, when groove 50 is positioned over detent ball 36 (FIG. 4a), the detent ball 36 can move into groove 50. This enables a user to remove the tool assembly 18 from socket 12. When groove 50 is not positioned over detent ball 36 (FIG. 4b), the detent ball 36 is held in groove 34, and tool assembly 18 is prevented from being removed from socket 12.

As seen in FIGS. 4a and 4b, socket 12 is further provided with an annular retaining ring groove 40 encircling socket 12 on an exterior surface. A retaining ring 44 is positioned in retaining ring groove 40. Sleeve 38 is also provided with two spaced apart annular grooves 46 and 48. When sleeve 38 is slid away from drive shank 14, retaining ring 44 springs radially outward from socket 12 into groove 46 in sleeve 38. Groove 46 is positioned to have groove 50 positioned over detent ball 36 so that tool assembly 18 can be removed (FIG. 4a). When sleeve 38 is slid toward drive shank 14, retaining ring 44 springs radially outward from socket 12 into groove 48. Groove 48 is positioned to have the groove 50 not positioned over detent ball 36, so that the detent ball 36 is moved into groove 34 of tool assembly 18 to lock tool assembly 18 within socket 12 (FIG. 4b).

Figure 6A:
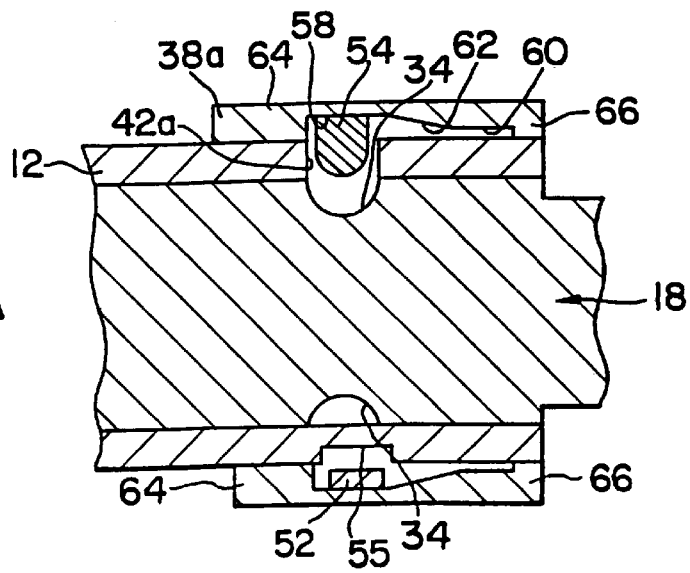
FIG. 6a is an enlarged cross-sectional view of a second embodiment along a line 4—4 in FIG. 1 illustrating a second locking mechanism for the two-ended reversible tool assembly with a sleeve positioned in an unlocked position.
Figure 6B:
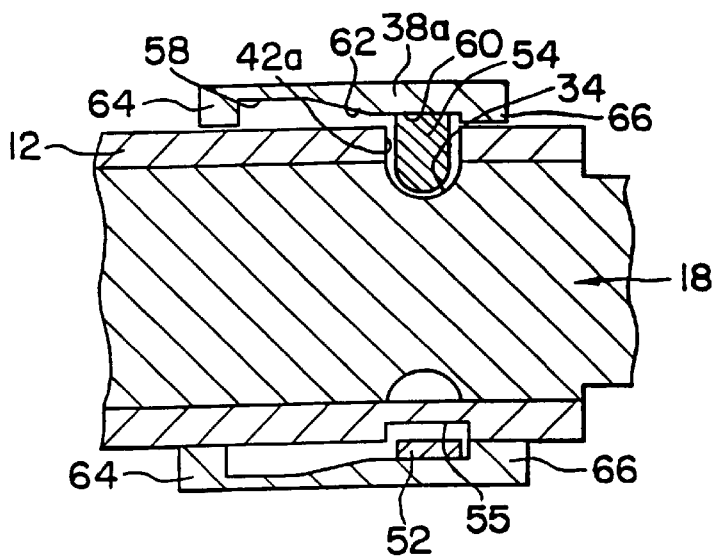
FIG. 6b is the same cross-section view as FIG. 6a with the sleeve moved to a locked position.
Figure 7:
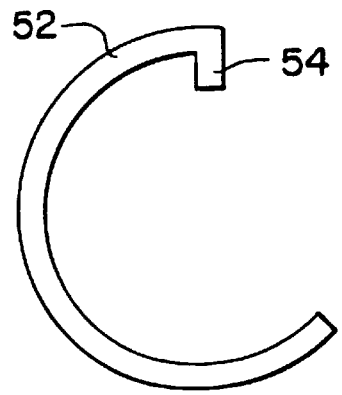
FIG. 7 is locking spring used in the second embodiment shown in FIG. 6a and 6b.

An alternate embodiment of a releasable retaining means is shown in FIGS. 6a and 6b. A shaped cylindrical sleeve 38a again surrounds hollow socket 12. Sleeve 38a is constrained to slideably move longitudinally on socket 12. A "C" shaped hook spring 52, constructed of resilient material for example spring steel, is provided as shown in FIG. 7 with a hook 54 at one end used to lock the reversible tool assembly 18 in place. In a preferred embodiment of this alternative embodiment, a single hook 54 is provided at one end of the "C" shaped hook spring 52, although hook spring 52 could as easily have double hooks, one located at either end of the "C" shaped hook spring so that both hooks could lock the reversible tool assembly 18 in place. Resilient "C" shaped hook spring 52 is biased to spring radially outwardly after being compressed.

Hollow socket 12 has a hole 42a, which extends through a wall of socket 12 from the exterior to the interior of the socket. Hole 42a is sized to slideably accept hook 54 of "C" shaped hook spring 52. In addition, a loading groove 55 is provided on socket 12 adjacent hole 42a into which hook spring 52 can be compressed as cylindrical sleeve 38a is slipped over hook spring 52 during initial assembly of tool 10.

Cylindrical sleeve 38a has a recessed interior camming surface 58 into which hook spring 52 can expand outwardly as shown in FIG. 6a so that reversible tool assembly 18 can be removed. Cylindrical sleeve 38a has a second recessed interior camming surface 60 which compresses spring 52 as sleeve 38a is moved across spring 52 to force hook 54 through hole 42a and into intermediate groove 34 as shown in FIG. 6b. With hook 54 positioned in intermediate groove 34, reversible tool assembly 18 is locked into hollow socket 12 and can not be removed until cylindrical sleeve 38a is moved to the unlocked position.

Camming surface 58 and camming surface 60 are connected with an intermediate camming surface 62 which forces spring 52 to contract as cylindrical sleeve 38a is moved between an unlocked position and a locked position. A first stop flange 64, formed on cylindrical sleeve 38a adjacent camming surface 58, prevents cylindrical sleeve 38a from moving beyond the unlocked position when being moved to unlock the reversible tool assembly 18. First stop flange 64 contacts hook spring 52 while hook 54 is still in hole 42a which prevents further movement of cylindrical sleeve 38a in a direction away from drive shank 14. When moving cylindrical sleeve 38a to the locked position, a second stop flange 66 on cylindrical sleeve 38a adjacent camming surface 60 prevents cylindrical sleeve 38a from moving beyond the locked position. The contact between the second stop flange and hook spring 52 stops the movement because hook 54 is held in position within hole 42a.

In operation, drive shank 14 is inserted into the chuck of a powered drill to prepare to drill a pilot hole in a workpiece. If the countersink and drill bit 20 is not exposed, the operator can slide sleeve 38 away from drive shank 14 to unlock the two-ended reversible tool assembly 18 from hollow socket 12. The reversible tool assembly 18 can then be removed, reversed, and reinserted into socket 12 with countersink and drill bit 20 exposed. Sleeve 38 is then slid toward drive shank 14 to lock reversible tool assembly 18 in hollow socket 12. The pilot hole and countersink can now be drilled.

When the time comes to drive a screw in the pilot hole, sleeve 38 is slid away from drive shank 14 to unlock two-ended reversible tool assembly 18 from socket 12. Reversible tool assembly 18 is then removed, reversed, and reinserted into socket 12 with screwdriver bit 22 exposed. Sleeve 38 is then slid toward drive shank 14 to again secure reversible tool assembly 18 within socket 12. The screw may now be driven with screwdriver bit 22. When drive shank 14 is rotated with the drill, rotational motion is transmitted through the mating polygonal shaped parts to screwdriver bit 22.

With this single tool both the operation of drilling a pilot hole and the operation of driving a screw can be performed. Because a screwdriver bit 22 with polygonal shank can be held in place by magnet 30, the screwdriver bit can be easily interchanged by just pulling the bit away from the magnet before inserting another screwdriver bit.

While the fundamental novel feature of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A quick release drill/driver apparatus for use with a powered drill having a chuck, the apparatus comprising:
    an elongate tool having a driving end and a working end;
    an elongate hollow socket open at one end and having a drive shank at the other end to be received by the chuck of a powered drill, the hollow socket being sized to accept the driving end of the tool within the interior thereof with the working end of the tool exposed;
    a driving means operatively connecting the tool with the socket for rotating the tool with the socket;
    a releasable retaining means for releasably retaining the tool within the hollow socket by way of a detent means;
    characterized in that the driving means is of polygonal shape by way of the open end of the hollow socket having a polygonal interior shape, and the driving end of the tool having an elongate polygonal shaped portion for mating with the polygonal interior shape of the socket; and
    the releasable retaining means comprising a circumferential groove in the elongate polygonal portion of the tool which groove is engageable with the detent means to retain the tool within the hollow socket;
    the detent means comprising a detent ball provided in a detent ball opening in a side wall of the hollow socket which detent ball opening is registrable with the circumferential groove, and sleeve means located on and moveable along the hollow socket for operating the detent ball into and out of engagement with the circumferential groove; and
    a registration retaining means comprising a circumferential retaining ring groove in the hollow socket, a retaining ring positioned in the retaining ring groove, a pair of spaced apart annular grooves on the interior surface of the sleeve, the retaining ring engageable with one of the annular grooves when the detent ball is operated into engagement with the circumferential groove of the tool and engageable with the other annular groove when the detent ball is operated out of engagement with the circumferential groove of the tool.

2. The quick release drill/driver apparatus of claim 1, wherein the polygonal interior shape of the open end of the hollow socket is a hexagon and wherein the polygonal shaped portion of the driving end of the tool is also a hexagon.

3. The quick release drill/driver apparatus of claim 1, wherein the sleeve means is slidably circumposed on the hollow socket and includes an internal annular cam moveable across and in contact with the detent ball for moving the ball into and out of the circumferential groove.

4. The quick release drill/driver apparatus of claim 3, wherein the circumferential groove has sloping walls, sloping outwardly, whereby the detent ball may be cammed out of the circumferential groove when the detent ball within the circumferential groove is moved away from the circumferential groove by moving the hollow socket relative to the tool.

5. A quick release drill/driver apparatus for use with a powered drill having a chuck, the apparatus comprising:
    an elongate tool having a driving end and a working end;
    an elongate hollow socket open at one end and having a drive shank at the other end to be received by the chuck of a powered drill, the hollow socket being sized to accept the driving end of the tool within the interior thereof with the working end of the tool exposed;
    a driving means operatively connecting the tool with the socket for rotating the tool with the hollow socket; and
    a releasable retaining means for releasably retaining the tool within the hollow socket by way of a releasable "C" ring detent means having cooperating components on the exterior of the tool and the interior of the socket;
    characterized in that the driving means is of polygonal shape by way of the open end of the hollow socket having a polygonal interior shape, and the driving end of the tool having an elongate polygonal shaped portion for mating with the polygonal interior shape of the socket; and
    the releasable retaining means comprising a circumferential groove in the elongate polygonal portion of the tool which groove is engageable with the detent means to retain the tool within the hollow socket.

6. The quick release drill/driver apparatus of claim 5, wherein the "C" ring detent means comprises:
    a "C" ring having an internally directed detent hook at one end thereof; and
    sleeve means located on the hollow socket, and wherein the hollow socket has an external circumferential recess in which the "C" ring is positioned and in which a detent opening is provided for receiving the "C" ring detent hook, the detent opening being registerable with the circumferential groove in the tool;
    the hook of the "C" ring is sized to releasably project into the circumferential groove; and
    the sleeve means is moveable along the hollow socket for operating the detent hook into and out of engagement with the circumferential groove of the tool.

7. The quick release drill/driver apparatus of claim 6, wherein the sleeve means is slidably circumposed on the hollow socket and includes an internal annular cam moveable across and in contact with the hook for moving the hook into the circumferential groove.

8. The quick release drill/driver apparatus of claim 5, wherein the "C" ring is constructed of resilient material and is collapsed against its normal bias when the annular cam moves the hook into the circumferential groove.

* * * * *